United States Patent [19]

Lohmar et al.

[11] 4,432,580
[45] Feb. 21, 1984

[54] INTERIOR LINING FOR MOTOR VEHICLES

[75] Inventors: Ernst Lohmar, Weinheim; Hans-Achim Kunkel, Reichelsheim, both of Fed. Rep. of Germany

[73] Assignee: Firma Carl Freudenberg, Weinheim, Fed. Rep. of Germany

[21] Appl. No.: 275,015

[22] Filed: Jun. 18, 1981

[30] Foreign Application Priority Data

May 30, 1980 [DE] Fed. Rep. of Germany ... 8023225[U]
Aug. 30, 1980 [DE] Fed. Rep. of Germany ... 8023224[U]
Aug. 30, 1980 [DE] Fed. Rep. of Germany ... 8023226[U]

[51] Int. Cl.³ .............................................. E04B 1/74
[52] U.S. Cl. .................................. 296/39 A; 181/290; 428/314.4
[58] Field of Search ........................... 296/39 A, 39 R; 428/315, 172, 159, 319.7, 319.9, 314.4; 244/119; 181/294, 290, 204

[56] References Cited

U.S. PATENT DOCUMENTS

| 3,741,844 | 6/1973 | Schwartz | 428/316.6 |
| 3,857,749 | 12/1974 | Yoshida | 428/33 |
| 4,035,215 | 7/1977 | Goldstone | 296/39 A |
| 4,172,918 | 10/1979 | Doerer | 428/316.6 |
| 4,263,727 | 4/1981 | Bender | 428/316.6 |
| 4,288,490 | 9/1981 | Alfter et al. | 296/39 A |

Primary Examiner—Richard A. Bertsch
Attorney, Agent, or Firm—Kenyon & Kenyon

[57] ABSTRACT

An interior lining for a motor vehicle is made from a foam layer of a cross-linked, closed-cell-foamed polypropylene laminated to a deep-drawable polyolefin sheet or a non-woven or woven fabric or laminated to both. The volumetric weight of the foam layer is 30 to 200 kg per cubic m. and provides dimensional and shape stability to the lining up to temperatures of about 120° C.

8 Claims, 3 Drawing Figures

INTERIOR LINING FOR MOTOR VEHICLES

BACKGROUND OF THE INVENTION

The invention relates to an interior lining for motor vehicles. More specifically, it relates to a layer of a closed-cell-foamed, cross-linked polyolefin laminated to a deep-drawable polyolefin sheet and/or a non-woven or woven fabric. The foam layer has a volumetric weight of 20 to 200 kg/m$^3$.

A similar interior lining is described in the brochure "Cross-Linked Polyethylene Foam", Order-No. 43503 of Oct. 1, 1973, of the firm Bayer Werke AG, Leverkusen, West Germany. This lining consists of a cross-linked polyethylene foamed with closed cells which can be shaped by deep-drawing after it is heated to a temperature of 110° to 140° C. Its mechanical properties correspond to those of known soft foams: its shape is easily deformable and it can be further deformed by the temperatures occurring in motor vehicles, such as those produced by heat or sun radiation. The use of such soft foams for an interior lining of a vehicle therefore requires additional steps and materials to provide stiffening and deformation stability. These steps and materials, however, are economically unattractive.

It is, therefore, an object of the invention to develop an interior lining for motor vehicles which is easy to produce and is distinguished by high rigidity while maintaining high stability of shape and dimension up to a temperature of about 120° C.

SUMMARY OF THE INVENTION

The invention is directed to an interior lining comprising a layer of closed-cell-foamed, cross-linked polypropylene laminated to a deep-drawable polyolefin sheet or a nonwoven or woven fabric or laminated to both wherein the foam layer has a volumetric weight of 50 to 175 kg per cubic m., when the lining is used as a vehicle side wall; a volumetric weight of 80 to 200 kg per cubic m., when the lining is used as a vehicle hat rack; and a volumetric weight of 30 to 80 kg per cubic m., when the lining is used as a vehicle ceiling. A preferred polyolefin for the sheet laminate is polypropylene.

BRIEF DESCRIPTION OF THE DRAWINGS

The drawings illustrate three embodiments of an interior lining according to the invention.

DETAILED DESCRIPTION OF THE INVENTION

Figure 1:
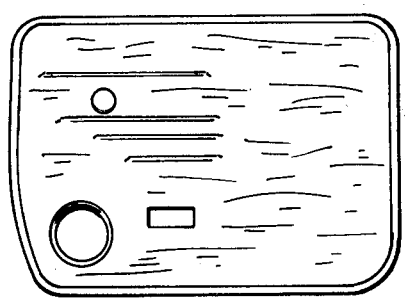
FIG. 1 shows a vehicle interior lining in the form of a side wall.

The invention employs a range volumetric weights for the foamed layer of the lining which depend upon the structure, shape and location of the lining in the vehicle. Within each of the foregoing ranges, optimum strength properties and a minimum use of material are obtained with respect to the specified purpose. The finished parts, which frequently have shapes covering largeareas, are light weight. Nevertheless, they possess high rigidity and satisfy the requirements for a firm, solid vehicular interior which will not deform shapewise or dimensionally. In addition, the rigidity provided by the volumetric weight ranges mentioned does not permit significant radiation into the interior of resonant vibrations derived from the vehicle body.

The cross-linked polypropylene closed-cell-foam used according to the invention exhibits great mechanical strength at temperatures up to about 120° C., in contrast to materials known in the art. Interior linings made from this foam thus exhibit high rigidity, high resistance to shape and dimension deformation, and high cushioning strength without secondary bracing elements when impacted or deformed by other stresses.

To improve the appearance, the abrasion resistance and the tear strength of the surface of the foam layer, it is advantageous to laminate a sheet or film of polyolefin onto the surface of the polypropylene foam using known processes such as flame-laminating technology or adhesive cementing. The use of an unstretched polypropylene sheet which may optionally have a surface grain is preferred for these purposes.

It is furthermore advantageous to laminate the surface additionally with a woven or non-woven fabric. The surface may also be varnished with a coating such as polyurethane varnish. A surface treated in this manner can be provided with grain in the deep-drawing process so that a leather-like appearance is obtained.

The foam layer consists preferably of a deep-drawn section from a mat of polypropylene foam, the wall thickness being reduced uniformly in the direction toward the outer edge. The edges used for attaching the lining to the vehicle may be densified to such an extent that the cross-linked polypropylene is completely free of cells in this region. The attachment edges thereby have a strength which is considerably higher than that of the cellular foam material, which makes possible the anchoring of the interior lining in specially prepared undercuts of the body. Moreover, the uniform density transition of the cellular structure of the foam material into the cell-free edge results in a uniform strength transition and accordingly produces an excellent bracing effect. The interior lining of this shape and cross-section has little or no tendency to vibrate in the center region. Vehicle fittings, such as door handles and window cranks, which fit through the lining, are additionally stabilized by the anchoring effect of the lining.

If the interior lining is anchored exclusively along its edges by special undercuts made in the body, a secondary advantage is obtained that corners or edges which project objectionably into the interior can be eliminated. With the metal stamping and fitting processes of existing vehicle assembly lines, it is easily possible to make smooth transitions from the inside of the interior lining to the adjacent parts of the body when this type of arrangement is used.

According to a specific embodiment, it is provided that the interior lining of the invention has cutouts and/or depressions for the attachment of fittings. This can apply, for instance, to sun visors, venting nozzles, loudspeaker boxes or ash trays. Fittings of this kind can be preassembled without difficulty which, from a workflow point of view, can be accomplished substantially more simply than after the assembly in a motor vehicle.

An improvement of the sound-deadening properties can be achieved if 10 to 25% by weight polyethylene is added to the polypropylene. This is understood to mean that the polypropylene and the polyethylene must be mixed uniformly, which can be accomplished, for instance, in an extruder. The polymeric mixture obtained in this manner is cross-linked through the action of high-energy radiation and is subsequently foamed. Such an interior lining can also be cemented directly onto parts of the body, such as the inside of the roof so that noises acting on the roof of the car such as rain or hail are not transmitted to the interior in any appreciable degree. The dimension and shape stability of corresponding part is nevertheless almost unchanged up to a temperature of about 120° C.

Further refinements of the invention will be explained by reference to the embodiments illustrated by the drawings. In general, these further features may be used with any embodiment of the invention.

In FIG. 1, the side wall lining shown is intended for a door. It consists of a deep-drawn mat of cross-linked, closed-cell-foamed polypropylene having a volumetric weight of about 80 kg per cubic m., the exposed surface of which is laminated to a polypropylene sheet with a pebbled surface. In the center region, the thickness is about 5 mm and in the vicinity of the outer edge the thickness is about 3 mm. The outer edge is rounded in order to obtain a uniform transition into the door frame. The inside wall lining contains several depressions and openings for receiving fittings to be installed later. These would include such fittings as a loudspeaker, an inner door pocket, a door handle and a window crank.

Figure 2:
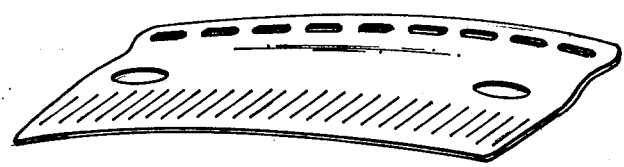
FIG. 2 shows a vehicle interior lining in the form of a hat rack.

The hat shelf shown in FIG. 2 consists of a deep-drawn layer of cross-linked, closed-cell-foamed polypropylene having a volumetric weight of 80 kg per cubic m. which is laminated on all surfaces with a polypropylene sheet. In the center region, the thickness of the foam layer is about 10 mm and in the vicinity of the perimeter of the attachment edges it tapers to a value of about 6 mm. The installation of the shelf can be accomplished by snapping it into corresponding recesses in the motor vehicle body. Through appropriate fitting, rattling noises are reliably prevented. In the vicinity of the lateral boundary edges, two depressions are provided, into which covered loudspeakers can be installed. Between the two depressions, a further cutout is provided for receiving a first-aid kit.

Figure 3:
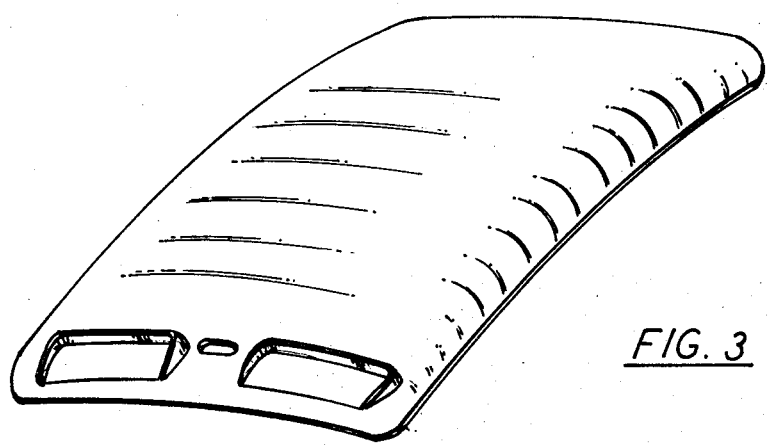
FIG. 3 shows a vehicle interior lining in the form of a car ceiling.

The car ceiling shown in FIG. 3 consists of a foam layer in the form of a deep-drawn plastic shell of a cross-linked polypropylene foamed with closed cells having a volumetric weight of 60 kg per cubic m. In the center region, the thickness is 8 to 10 mm. It radially decreases to a final value of about 4 mm at the perimeter attachment edges. On the underside, a deep-drawable planar textile such as a woven or non-woven fabric is laminated onto the foam layer in order to improve the appearance. In the forward portion, the car ceiling has two side by side deep-drawn depressions which are intended to receive the sun visors. Between the two depressions, a cutout is provided, into which a lamp socket for interior lighting can be inserted.

In an alternative embodiment, the foam layer has a volumetric weight of 30 kg per cubic m. and it contains, besides polypropylene, 10 to 25% polyethylene as a blending material. A car ceiling of this kind can be cemented to the inside of the outer roof. Noises acting on the car roof, such as rain or hail, are effectively reduced. The foam layer is nevertheless rigid enough that automatic installation techniques can be used and sufficient shape and dimensional stability are provided up to a temperature of about 120° C.

We claim:

1. An interior side wall lining for a motor vehicle, which comprises: a layer of a directly cross-linked, closed-cell-foamed composition of polypropylene in mixture with 10% to 25% by weight polyethylene, laminated to a cover layer selected from the group consisting of a polyolefin sheet, a fabric of a nonwoven or woven construction and a two layer combination of the sheet and the fabric, wherein the foam layer has a volumetric weight of 50 to 175 kg per cubic m; the direct cross-linking is by carbon-carbon single bonds between substantially all of the linear polypropylene and polyethylene molecules used in the composition such that substantially all molecules are cross-linked at least once; and the balance between amorphousness and crystallinity of the composition is sufficient to make the composition flexible and sound absorbing yet allow it to retain its shape at a temperature up to about 120° C.

2. An interior lining for use as a shelf in a motor vehicle, which comprises: a layer of a directly cross-linked, closed-cell-foamed composition of polypropylene with 10% to 25% by weight polyethylene, laminated to a cover layer selected from the group consisting of a polyolefin sheet, a fabric of a non-woven or woven construction and a two layer combination of the sheet and the fabric, wherein the foam layer has a volumetric weight of 30 to 80 kg per cubic m; the direct cross-linking is by carbon-carbon single bonds between substantially all of the linear polypropylene and polyethylene molecules used in the composition such that substantially all molecules are cross-linked at least once; and the balance between amorphousness and crystallinity of the composition is sufficient to make the composition flexible and sound absorbing, yet allow it to retain its shape at a temperature up to about 120° C.

3. An interior ceiling lining for a motor vehicle, which comprises: a layer of a directly cross-linked, closed-cell-foamed composition of polypropylene with 10% to 25% by weight polyethylene, laminated to a polyolefin sheet or a nonwoven or woven fabric or laminated to both the sheet and fabric, wherein the foam layer has a volumetric weight of 30 to 80 kg per cubic m; the direct cross-linking is by carbon-carbon single bonds between substantially all of the linear polyproylene and polyethylene used in the composition such that substantially all molecules are cross-linked at least once; and the balance between amorphousness and crystallinity of the composition is sufficient to make the composition flexible and sound absorbing yet allow it to retain its shape at a temperature up to about 120° C.

4. An interior lining according to claim 1, 2 or 3 wherein the polyolefin sheet is unstretched polypropylene.

5. An interior lining according to claim 1, 2 or 3 which comprises: a layer section from a deep-drawn mat of foamed polypropylene wherein the wall thickness is uniformly reduced in the direction toward the edges to be used for attachment to the vehicle.

6. An interior lining according to claim 5 wherein the attachment edges are cell-free polypropylene.

7. An interior lining according to claim 5 wherein the polyolefin sheet is polypropylene.

8. An interior lining according to claim 1, 2 or 3 wherein the foam layer has one or more cutouts and/or depressions for receiving vehicle fittings.

* * * * *